United States Patent
Walter et al.

(10) Patent No.: US 8,771,580 B2
(45) Date of Patent: Jul. 8, 2014

(54) METHOD FOR MAKING MOLDED SKINS FROM MULTIPLE PLASTICS

(75) Inventors: André Walter, Bomlitz (DE); Harald Dalibor, Garbsen (DE); Michael Heidkamp, Dedelsdorf (DE); Hans-Bernd Jacoby, Rehburg-Doccum (DE); Zbigniew Parzelski, Wolfenbüttel (DE); Marco Sander, Leipzig (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 330 days.

(21) Appl. No.: 12/382,765

(22) Filed: Mar. 24, 2009

(65) Prior Publication Data

US 2010/0090360 A1   Apr. 15, 2010

Related U.S. Application Data

(63) Continuation of application No. PCT/EP2007/057415, filed on Jul. 18, 2007.

(30) Foreign Application Priority Data

Sep. 30, 2006  (DE) .......................... 10 2006 046 590

(51) Int. Cl.
*B29C 41/04* (2006.01)
*B29C 41/46* (2006.01)

(52) U.S. Cl.
USPC ............ 264/310; 264/250; 264/254; 264/294

(58) Field of Classification Search
None
See application file for complete search history.

(56) References Cited

U.S. PATENT DOCUMENTS

| | | | |
|---|---|---|---|
| 4,925,151 A | 5/1990 | Gray | |
| 5,074,773 A * | 12/1991 | Tischler | ........................ 425/134 |
| 5,234,653 A | 8/1993 | Buzzoni et al. | |
| 5,580,501 A * | 12/1996 | Gallagher et al. | ........... 264/45.3 |
| 6,071,619 A | 6/2000 | De Winter | |
| 6,524,509 B1 * | 2/2003 | Shope et al. | ................... 264/246 |
| 6,875,390 B2 | 4/2005 | Cowelchuk | |
| 2006/0208389 A1 | 9/2006 | Nyssen | |

FOREIGN PATENT DOCUMENTS

| | | |
|---|---|---|
| DE | 103 11 654 A1 | 9/2004 |
| EP | 0 972 625 | 1/2000 |
| FR | 2 763 535 | 11/1998 |
| JP | 59-159309 | 9/1984 |
| JP | 59-192524 | 10/1984 |
| JP | 60-208210 | 10/1985 |
| JP | 03-055219 | 3/1991 |
| JP | 10-95250 | 4/1998 |
| JP | 11-348057 | 12/1999 |

OTHER PUBLICATIONS

Machine Translation of JP 11-348057 A, Dec. 21, 1999.*
Derwent Abstract of JP 11-348057 A, Dec. 21, 1999.*
Translation of JP 11-348057 A, Dec. 21, 1999.*
Translation of JP 60-208210 A, Oct. 19, 1985.*

* cited by examiner

*Primary Examiner* — Benjamin Schiffman
(74) *Attorney, Agent, or Firm* — Walter Ottesen P.A.

(57) ABSTRACT

The invention relates to a method for the production of plastic molded skins which are built up by consecutively melting multiple plastics onto each other. The surface of the forming tool is partially covered with a covering or mask during the melting of a first plastic powder and the first plastic powder is applied to the forming tool by a powder spray method. Thereafter, the covering or mask is removed from the surface of the forming tool and the second plastic powder is applied to the surface of the forming tool and to the first plastic powder by rotation sintering.

10 Claims, No Drawings

METHOD FOR MAKING MOLDED SKINS FROM MULTIPLE PLASTICS

CROSS REFERENCE TO RELATED APPLICATIONS

This application is a continuation application of international patent application PCT/EP 2007/057415, filed Jul. 18, 2007, designating the United States and claiming priority from German application 10 2006 046 590.3, filed Sep. 30, 2006, and the entire content of both applications is incorporated herein by reference.

FIELD OF THE INVENTION

The invention relates to a method for the production of plastic molded skins, in particular for interior parts of a motor vehicle, for example, dashboards and door trim. The plastic molded skins are built up by successive continuous melting on of several plastic powders of different properties on surface regions of a heated forming tool and the regions of the surface, which are provided with plastic powders of different properties, are separated from one another by webs projecting on the surface of the forming tool. At least one of the regions of the surface that are delimited by the webs is provided during a melting on of a first plastic powder with a covering or mask which is provided with a seal in its peripheral regions and rests on the webs.

BACKGROUND OF THE INVENTION

Methods for the production of two-colored plastic molded skins by the "masking technique" are known.

EP 0 972 625 A1 is incorporated herein by reference and describes an apparatus for this purpose, namely, a forming tool for the production of two-colored plastic molded skins for parts of a motor vehicle, that is, especially dashboards, door trim, et cetera. The production method used here for producing sintered foils/slush skins is a rotational sintering, in which a plastic powder is in the rotating forming tool and melts onto correspondingly heated wall parts of the forming tool.

The apparatus shown here has two different lower parts of the forming tool boxes. The lower parts of the forming tool boxes, which in each case also comprise the powder bed, are detachably arranged with respect to the single upper forming tool box onto which the plastic powder melts. For the production of two-colored plastic molded skins, the first lower forming tool box has a shell-like projection, which projects into the interior space and with which—as with a mask—parts of the upper forming tool box are covered.

In a first step, a powder of a first color is melted on by rotational sintering with the regions of the upper forming tool box that lie under the shell-like covering not being coated and therefore remaining free from powder.

Before a second step, the first lower forming tool box is replaced by a second lower forming tool box, which contains a powder of a different color and does not have any coverings. In the subsequently repeated rotational sintering, the powder with the new color melts onto the region of the upper forming tool box that was previously kept clear and on the rear side of the already existing molded skin. After cooling and removal of the molded skin from the forming tool, a two-colored plastic molded skin is obtained on the side that faces the forming tool and is intended to become the outer side.

During the first working step, the shell-like covering of the lower forming tool box that projects into the interior space must for this purpose be carefully sealed off with respect to the upper forming tool box so that no sintering powder of the first color gets into the covering region. For this purpose, the shell-like projection has at its edges sealing elements which are formed so as to be elastic and/or hollow on the inside and can, if required, be charged with pressure or elastic media on the inside.

The great amount of work involved in changing the lower forming tool boxes and the difficult sealing of the mask, that is, the sealing between the edges of the shell-like covering of the lower forming tool box that projects into the interior space and the inner side of the upper forming tool box, are disadvantageous here. Thermal expansions and different pressure conditions of the seals, caused by complicated inner shapes of the upper forming tool box, lead to leakages and irregular abutment, which can make the color boundaries become blurred.

A similar situation exists in the case of the powder sintering method disclosed in United States patent publication 2006/0208389 with multiple powder application steps. In this method, the use of a mask and an inflatable seal are essential for the invention. The seal is located on the mask and lies laterally against and between separating webs and automatically clamps the mask when inflated. First, with the mask clamped in place, a first powder application step is carried out, then the mask is removed and powder sintering is carried out once more. Although the powder boxes required for this purpose can themselves be of a simpler design, the handling of multiple heavy boxes with different types of powder is in fact to be regarded rather as a disadvantage in mass production. United States patent publication 2006/0208389 is incorporated herein by reference.

U.S. Pat. No. 5,234,653 is incorporated herein by reference and describes a method for the production of multicolored plastic molded skins by sintering in which a plastic powder is in a forming tool divided by separating walls and melts onto correspondingly heated wall parts of the forming tool. The fixation of the separating walls takes place by means of pressure systems within the separating walls. By means of the pressure system, the separating walls are clamped with the aid of sealing gaskets between the lower forming tool and the upper forming tool and in this way provide a reliable sealing in the respective sintering operations with different color powders.

Here too there is a disadvantage because a relatively elaborate fixing of the separating walls has to be performed and, in addition, a high pressure force is required for the pressure systems.

U.S. Pat. No. 6,071,619 is incorporated herein by reference and discloses a method and an apparatus for carrying out a spray molding process for a two-color method in which a mask is placed on top of a web or upstanding edge which delimits certain regions of a spray mold and separates them from the other regions of the surface. The edges of the mask project slightly towards the spray side. The elastomeric spray material is then sprayed onto one side of the upstanding edge. Thereafter, the mask is removed and another elastomeric material, for example, one of a different color, is sprayed on. On the basis of the materials described in the exemplary embodiments, a method for spraying liquid components is disclosed. However, because of the required amounts of solvent alone, spraying methods with multiple different liquid materials are not easy to manipulate in industrial mass production processes.

SUMMARY OF THE INVENTION

The invention was therefore based on the object of providing a method for making plastic molded skins comprising different plastics in different regions, that is, for making two-colored plastic molded skins by means of sintering, which ensures a plastic molded skin of high quality and exact color separation without the individual plastic regions or color regions becoming blurred. In the method, a covering or mask can be easily applied and removed and the apparatus is configured so as to be as simple as possible in its handling and with respect to the required accessories in terms of machinery/equipment.

In the method according to the invention, different sintering methods are combined in a single production process wherein:

a) at the start, the first plastic powder is applied to the forming tool by means of powder spraying methods, the forming tool being kept at a first temperature during the spraying;

b) the temperature of the forming tool is then increased such that the first plastic powder applied in the spraying method adheres to the non-masked regions of the forming tool by melting on;

c) the covering or mask is removed from the surface of the forming tool;

d) the forming tool is then placed onto a powder box containing a second plastic powder and is closed with the latter with the surface of the forming tool facing the interior space of the powder box;

e) the forming tool and the powder box are brought into movement/rotation such that the second plastic powder trickles or flows over the surface of the forming tool with the second plastic powder adhering to the surface of the forming tool by rotational sintering and adhering to the first plastic powder by melt-on;

f) the temperature of the forming tool is increased such that the first and second plastic powders fully react and fuse to form a homogeneous plastic molded skin;

g) the forming tool is removed from the powder box and then cooled such that the homogeneous plastic molded skin can be removed from the forming tool.

DESCRIPTION OF THE PREFERRED EMBODIMENTS OF THE INVENTION

With the method according to the invention, a preliminary powder spraying process of a first plastic powder and a subsequent powder rotational sintering process (slush process) of a second plastic powder are carried out. The mask covering only takes place during the powder spraying process and at first the advantage is provided when carrying out the method that the masks can be easily fixed in the forming tool from the outside, if needed, even only lightly pressed by an automatic handling unit against the corresponding regions of the forming tool while the operation of spraying around the mask is performed. Furthermore, apart from a spray device/spray gun that is correspondingly set up and, if needed, robot-guided, this powder spraying process does not require any major investment in machinery and, because there are no heavy moving machine parts, high cycle times can be realized in mass production.

Accordingly, all that is needed in the method is that the second plastic powder is manipulated with the aid of a powder box so that it is only necessary for this one powder box to be moved in the machine, and not multiple powder boxes, as is the case in prior-art rotational sintering processes. The number of "heavy" machine parts is therefore reduced by the method according to the invention. As a result, automation of the method, is greatly facilitated and—as already explained—suitability for mass production in the sense of high cycle times and utilization is increased significantly. The corresponding temperature adjustments assist a reliable carrying out of the method.

In addition, exact separation of the two melted-on plastic powders is achieved, that is, a well-defined color separation without the individual color regions becoming blurred while avoiding the breaking down and running together of powder accumulations that is customary with the usual multiple rotational sintering methods. With the previously known methods, an accumulation of the powder fill builds up at the edges of covering shells, and there is therefore a thickening of the powder layer, which breaks down in the direction of the covered regions and blurs the color profile after the covering is lifted off. In the method according to the invention, the spraying of the first plastic powder prevents the buildup of such thickenings. The spraying process should not take too long and should not exceed about 180 seconds.

As already stated, an advantageous embodiment is one wherein the plastic powders have a different color as the different characteristic. This then makes it possible in a simple way, and with the advantages described, to produce, for example, dashboards of which the upper part, facing the windshield, is made in a color and with a pigmentation density such that disturbing reflections of sunlight are avoided.

A further advantageous embodiment is one wherein the plastic powders have a different density and/or foaminess as the different characteristic. This makes possible in a simple way to produce surfaces which have, for instance, a different appearance or feel in different regions.

A further advantageous embodiment provides that, during the powder spraying in method step a), the temperature of the forming tool is 190° to 210° C., preferably 195° C. Together with the kinetic energy of the spraying method and the further development of the method, that is, during the melt-on of the first plastic powder in method step b), the temperature of the forming tool is 200° to 220° C., preferably 210° C. This achieves a first slight "adherence" and just beginning slight coagulation of the spray powder which, although adequate to fix the powder particles in place, does not yet allow a "through melting" to occur.

A further advantageous embodiment of the method is one in which, to obtain the full reaction and fusion of the first and second plastic powders to form a homogeneous plastic molded skin in method step f), the temperature of the forming tool is 225° to 240° C., preferably 235° C. As a result, together with the second plastic powder, there is an adequate heat input for complete melting and coagulation, and consequently for the forming of a homogeneous plastic molded skin comprising multiple layers/colors.

A further advantageous embodiment of the method is one in which the seal of the covering or mask that rests on the webs is switchably transferred into a sealing position, as achieved in particular by the arrangement of the seal described further below within a groove and its movement by expansion elements (flexible tube). This allows the covering or mask to be initially fixed securely in its place on the forming tool without deformation of the seal and without sealing forces being able to cause displacement of the mask on the webs. This measure serves for reliably maintaining tolerances, in particular in the case of high automation.

A further advantageous embodiment of the method is one wherein, during the powder spraying in method step a), the forming tool is positioned such that it is downwardly open. As a result, on the one hand, excess powder can fall out and, on the other hand, the forming tool is disposed immediately in the position in which the powder box, known as the "bucket"

and with the second plastic powder, can be easily connected to the forming tool from below.

An apparatus that is particularly suitable for carrying out the method according to the invention is configured in such a way that, in particular, the lateral dimensions of the covering or mask include compensation for the thermal expansions of the forming tool. At the temperatures of 180° to 250° C. required for the sintering process, expansions of the edge regions of the coverings following from heat transfer become very noticeable and lead to leakages unless such a compensatory measure is already provided in the structural design of the coverings.

This advantage is enhanced by the seal being produced by the pressure die-casting method and therefore being adapted to the shape and dimensions of the mask or the webs of the forming tool. The seals can of course be formed as die-cast seals either completely or only in regions that are particularly at risk. Of course, the dimensions of the seal should also include the compensation for thermal expansions already mentioned above in order to provide the best possible sealing effect.

A further advantageous embodiment of the invention is one in which the seal is placed in a groove located in the covering/mask and is movably arranged in the groove, that is, it can be pushed into the final sealing position after the fixing of the covering or mask. As a result, expansions and stresses are avoided completely such as otherwise occur as a result of the pressing of a seal, for example when a cover is screwed on.

It is in turn particularly advantageous if the seal is movable within the groove by way of an expandable flexible tube arranged on the underside of the seal. Accordingly, the seal remains uninfluenced by positioning stresses, which has the consequence that the service lives of such seals are significantly extended, if compared for instance with the service lives of inflatable seals, which are influenced particularly strongly by positioning stresses or forces.

In the method according to the invention and the corresponding apparatus, the seal can also be placed in a groove only partially or in regions under particular stress, and over the rest of its length merely abut wall parts.

The seals are advantageously produced from permanently elastic and temperature-resistant material, preferably from polyurethane or silicone rubber. This achieves a well-defined edge formation between the individual color regions or sintered regions even over a long time in use and under changing thermal loads. Of course, the coverings/masks and also the seals, grooves, et cetera should be cleaned after a certain number of cycles.

A further advantageous embodiment of the invention is one wherein the covering or mask is positively locked with the forming tool. The locking is preferably arranged below the mask so as to provide a connection which can be engaged and released both reliably and quickly and is well suited for automatic methods, for example, for the placement and locking of the covering or mask by means of a handling robot.

The coverings or masks, as well as the forming tool itself, can be of a one-part or multi-part configuration, for example, provided with releasable flaps or slides to ensure good removal from the forming tool in the presence of undercuts.

It is understood that the foregoing description is that of the preferred embodiments of the invention and that various changes and modifications may be made thereto without departing from the spirit and scope of the invention as defined in the appended claims.

What is claimed is:

1. A method for making a plastic molded skin for interior motor vehicle parts including dashboards and door trim, the method comprising the steps of:
    (a) providing a forming tool having a surface and projecting webs on said surface for separating regions of said surface from each other for accommodating plastic powders of respectively different characteristics;
    (b) applying a covering or mask to at least one of said regions with said covering or mask having a peripheral region whereat a seal is provided in seal tight engagement with said projecting webs;
    (c) applying a first plastic powder to said forming tool utilizing a powder spray method while maintaining said forming tool at a first temperature during spraying of said first plastic powder;
    (d) thereafter increasing the temperature of said forming tool so as to cause the first plastic powder applied in step (c) to adhere to the unmasked regions of said forming tool by melting on;
    (e) removing said covering or mask from said at least one of said regions;
    (f) thereafter placing said forming tool onto a powder box containing a second plastic powder and connecting said forming tool seal tight to said powder box with said surface of said forming tool facing toward an interior space of said powder box;
    (g) imparting movement/rotation to said forming tool and said powder box so as to cause said second plastic powder to flow onto said surface of said forming tool and to cause, via rotation sintering, to adhere said second plastic powder to said surface and to said first plastic powder by melting on;
    (h) increasing the temperature of said forming tool so that said first and second plastic powders completely react and fuse to a homogeneous plastic molded skin;
    (i) removing said forming tool from said powder box; and,
    (j) then cooling said forming tool so as to permit the homogeneous plastic molded skin to be removed therefrom,
    wherein an expandable flexible tube is provided within a groove of said covering or mask at an underside of the seal;
    wherein said seal is disposed entirely in the groove and is movable within said groove of said covering or mask prior to being transferred into a sealing position; and,
    wherein said seal of said covering or mask lying against said projecting webs is switchably transferred into said sealing position.

2. The method of claim 1, wherein said first and second plastic powders have different characteristics defined by respectively different colors.

3. The method of claim 1, wherein said first and second plastic powders have different characteristics defined by different densities and/or different degrees of foaminess.

4. The method of claim 1, wherein the temperature of the forming tool lies in a range of 190° C. to 210° C. during said method step (c).

5. The method of claim 4, wherein said temperature of said forming tool in said method step (c) is 195° C.

6. The method of claim 1, wherein the temperature of said forming tool lies in a range of 200° C. to 220° C. during the melting on of said first plastic powder in said method step (d).

7. The method of claim 6, wherein said temperature of said forming tool in said method step (d) is 210° C.

8. The method of claim 1, wherein the temperature of said forming tool lies in a range of 225° C. to 240° C. during said method step (h) so as to permit a complete reaction and fusion of said first and second plastic powders into said homogeneous plastic molded skin.

9. The method of claim 8, wherein said temperature of said forming tool in method step (h) is 235° C.

10. The method of claim 1, wherein the forming tool is positioned open downwardly during the powder spraying in said method step (c).

\* \* \* \* \*